May 5, 1970     W. P. LEPORE ET AL     3,510,837
VEHICLE BACK-UP WARNING DEVICE
Filed July 6, 1967
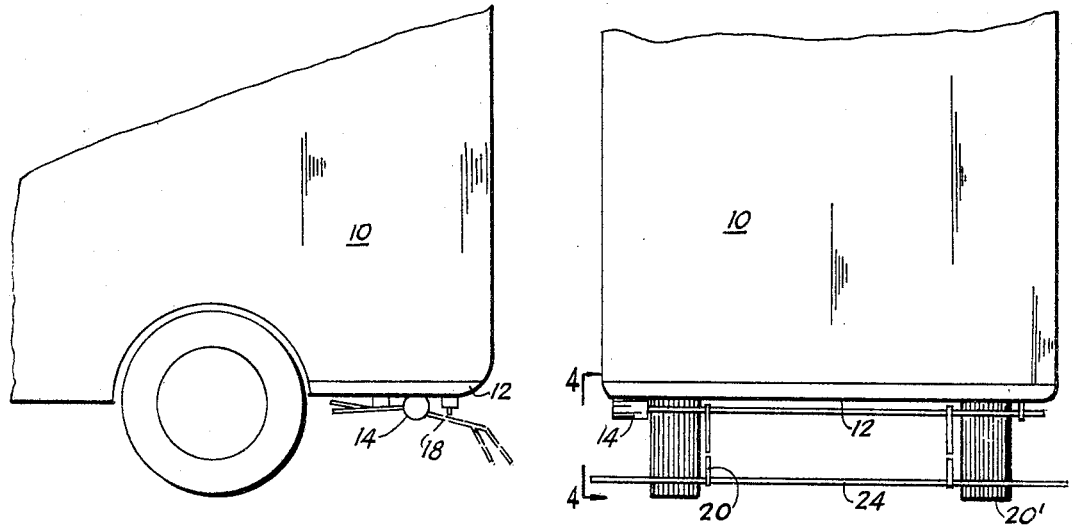
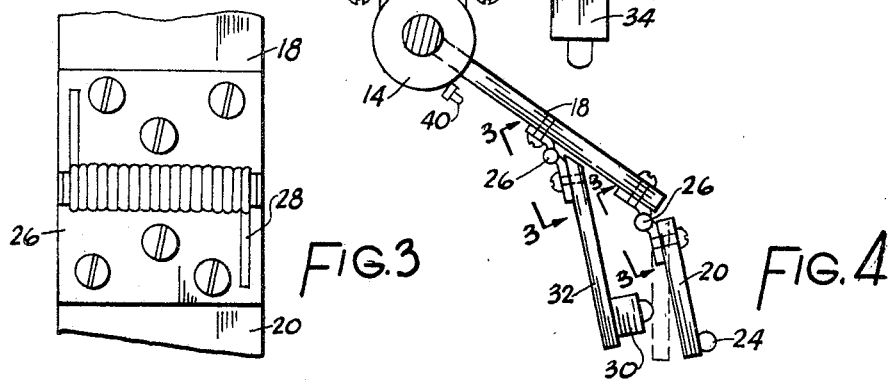
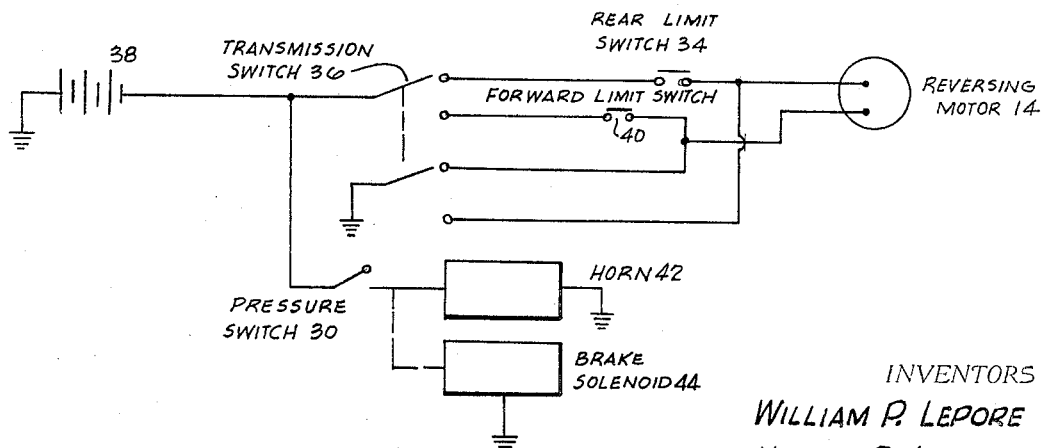
INVENTORS
WILLIAM P. LEPORE
HENRY D. LEPORE United States Patent Office 3,510,837
Patented May 5, 1970

3,510,837
VEHICLE BACK-UP WARNING DEVICE
William P. Lepore and Henry D. Lepore, both of
26 South St., Marlboro, Mass. 01752
Filed July 6, 1967, Ser. No. 651,444
Int. Cl. B60q
U.S. Cl. 340—61                                           5 Claims

ABSTRACT OF THE DISCLOSURE

A device adapted to be secured to the rear of a vehicle to sound a horn or cause braking of the vehicle when the vehicle is moving in reverse and strikes an object.

SUMMARY OF THE INVENTION

We provide a member having a front end secured to the rear of a vehicle and a rear end extending rearwardly from the vehicle, the member being pivotable about its front end between a first horizontal position and a second downwardly inclined position. Means secured to the front end of the member and responsive to the position of the transmission lever in the vehicle places the member in the first position when the lever is in forward and places the member in the second position when the lever is in reverse. A linkage extending downwardly and outwardly from the rear of the vehicle has its upper end hingedly secured to the rear end of the member. This linkage is normally biased into an inclined position and is forced into a vertical position when the vehicle is in reverse and the linkage strikes an object.

A normally open pressure switch is positioned adjacent the linkage and is closed only when the linkage contacts it. The linkage only contacts the switch upon striking an object.

Means responsive to the closing of the switch either sound the horn or operate the brakes, thus permitting corrective action to be taken before significant damage is caused.

BRIEF DESCRIPTION OF THE DRAWINGS

In the drawings:

FIG. 1 is a side view of a vehicle incorporating my device;

FIG. 2 is a rear view thereof;

FIG. 3 is a detail view of a hinge used in my device as taken through 3—3 in FIG. 4.

FIG. 4 is a detail side view of my device as taken through 4—4 in FIG. 2; and

FIG. 5 is a circuit diagram of my invention.

DETAILED DESCRIPTION OF PREFERRED EMBODIMENT

Referring now to FIGS. 1–4, there is shown a truck 10 having secured to the bottom rear surface 12 thereof a reversible motor 14. The front end of member 18 is secured to the shaft of the motor whereby rotation of the motor depending upon its direction raises or lowers the rear end thereof. The rear end always extends rearward of the truck rear. Member 18 is disposed at one rear end of the truck; another like member 18' is disposed at the other rear end and these members are interconnected by a transverse horizontal bar 24. Linkages 20 and 20' are each hingedly secured at 26 to their upper ends to the rear ends of corresponding members 18 and 18'. The linkages extend downward and outward from the rear of the vehicle and are interconnected at their bottom ends by another horizontal transverse bar 24. The hinges 26 are spring loaded as shown at 28 and normally bias the linkages into an inclined position. A pressure switch 30, normally open, disposed adjacent but in front of linkage 22 is secured to an inclined member 32 secured in turn by hinge 26 to an intermediate point on member 18. A normally closed rear limit switch 34 is secured to surface 12. Normally closed forward limit switch 40 is disposed adjacent the motor as shown.

A double pole double throw transmission switch 36 controlled by the transmission lever is connected in circuit with the automobile battery 38 and the limit switches and motor. When the transmission lever is placed in forward position, motor 14 rotates member 18 counterclockwise about its front end until the member strikes switch 34 to open same and disables the motor for further clockwise rotation. When the lever is placed in reverse position, motor 14 rotates member 18 clockwise until it strikes switch 40 to open same and disables the motor from further clockwise rotation, with the member 18 extending inclinedly downward. Then as the vehicle travels in reverse, nothing happens until bar 24 and linkages 20 and 20' strike an object, moving the linkages into a vertical position to close switch 30. This completes a circuit either to the horn 42 which then sounds an alarm or to a brake solenoid 44 which is then energized and actuates the brake. As soon as the vehicle is moved out of contact with the object, the linkages return to the normally biased position.

Having thus described our invention, we claim as new and desire to secure by Letters Patent:

1. In combination with a vehicle having a transmission lever with forward and reverse positions;
    a member having a front end secured to the rear of the vehicle and a rear end extending rearwardly from the rear of the vehicle, said member being pivotable about its front end between a first horizontal position and a second downwardly inclined position;
    means secured to the front end of the member and responsive to the position of the lever to place the member in the first position when the lever is in forward position and to place the member in the second position when the lever is in reverse position;
    a linkage extending downwardly and outwardly from the rear of the vehicle, the upper end of the linkage being hingedly secured to the rear end of the member, said linkage being normally biased into an inclined position and being forced into a vertical position when the vehicle is in reverse and said linkage strikes an object; and
    a normally open pressure switch positioned adjacent said linkage, said pressure switch being closed only when said linkage contacts same, said linkage only contacting said switch upon striking said object.

2. The combination as set forth in claim 1 wherein said vehicle has a horn and means responsive to said pressure switch when closed to operate said horn.

3. The combination as set forth in claim 1 wherein said vehicle has a solenoid which when energized operates the brakes and means responsive to the pressure switch when closed to energize the solenoid.

4. The combination as set forth in claim 1 wherein said means includes a reversing motor, and a transmission lever controlled switch for causing the motor to rotate in one direction when the lever is in forward position and to rotate in the opposite direction when the lever is in reverse position.

5. The combination as set forth in claim 1 wherein said means includes a reversing motor, a transmission lever controlled switch for causing the motor to rotate in one direction when the lever is in forward position and to rotate in the opposite direction when the lever is in reverse position and first and second limit switches, said first switch disabling said motor from further rotation in said one direction when the member is in the first position, said second switch disabling said motor from further rotation in said other direction when the member is in the second position.

References Cited

UNITED STATES PATENTS

| 2,444,635 | 7/1968 | Dennis | 340—61 |
| 3,012,225 | 12/1961 | Holt et al. | 340—61 |
| 3,409,874 | 11/1968 | Bowler et al. | 340—61 |

ALVIN H. WARING, Primary Examiner

U.S. Cl. X.R.

200—61.44